United States Patent
Chankaya et al.

(10) Patent No.: US 10,033,236 B2
(45) Date of Patent: Jul. 24, 2018

(54) VACUUM GAP GENERATORS AND MOTORS

(71) Applicants: Kurt M. Chankaya, Keller, TX (US); Arthur Philip Schuetze, Fort Worth, TX (US)

(72) Inventors: Kurt M. Chankaya, Keller, TX (US); Arthur Philip Schuetze, Fort Worth, TX (US)

(73) Assignee: Lockheed Martin Corporation, Bethesda, MD (US)

(*) Notice: Subject to any disclaimer, the term of this patent is extended or adjusted under 35 U.S.C. 154(b) by 283 days.

(21) Appl. No.: 14/803,999

(22) Filed: Jul. 20, 2015

(65) Prior Publication Data

US 2016/0028283 A1  Jan. 28, 2016

Related U.S. Application Data

(60) Provisional application No. 62/028,016, filed on Jul. 23, 2014.

(51) Int. Cl.
| | |
|---|---|
| *H02K 3/24* | (2006.01) |
| *H02K 1/32* | (2006.01) |
| *H02K 9/197* | (2006.01) |
| *H02K 15/02* | (2006.01) |

(52) U.S. Cl.
CPC ............ *H02K 3/24* (2013.01); *H02K 1/32* (2013.01); *H02K 9/197* (2013.01); *H02K 15/02* (2013.01); *H02K 2205/12* (2013.01)

(58) Field of Classification Search
CPC ...... H02K 15/02; H02K 1/32; H02K 2205/12; H02K 3/24; H02K 9/197
USPC .......................................................... 310/54
See application file for complete search history.

(56) References Cited

U.S. PATENT DOCUMENTS

| | | | |
|---|---|---|---|
| 4,101,793 A | 7/1978 | Berthet et al. | |
| 4,239,999 A | 12/1980 | Vinokurov et al. | |
| 4,315,172 A | 2/1982 | Intichar et al. | |
| 5,122,704 A * | 6/1992 | Blakeley | H02K 3/24 310/192 |
| 5,331,819 A | 7/1994 | Matsuda et al. | |
| 2002/0170298 A1* | 11/2002 | Laskaris | F17C 13/006 62/64 |

(Continued)

FOREIGN PATENT DOCUMENTS

EP       2 667 486 A2    11/2013

OTHER PUBLICATIONS

EPO Communication and extended European search report re Application No. 15178124.2-1902/2978104, dated Jul. 13, 2016.

(Continued)

*Primary Examiner* — Alex W Mok
(74) *Attorney, Agent, or Firm* — Baker Botts L.L.P.

(57) ABSTRACT

In one embodiment, a generator or an alternating current (AC) motor includes a stator and a rotor. The rotor is configured to rotate at least partially within the stator or around the stator and is separated from the stator by a gap having a partial vacuum. The rotor includes a shaft configured to permit a flow of coolant and a plurality of microchannels formed within the rotor. The microchannels are fluidly coupled to the shaft and are configured to permit the coolant to pass from the shaft through at least a portion of the rotor in order to provide cooling for the rotor.

16 Claims, 5 Drawing Sheets

(56) References Cited

U.S. PATENT DOCUMENTS

2005/0040776 A1* 2/2005 Sibley ................ F16F 15/3153
  318/150
2012/0104884 A1 5/2012 Wagner et al.
2013/0195695 A1* 8/2013 Van Dam ............... H02K 1/278
  417/410.1

OTHER PUBLICATIONS

Lohtander et al., The Capability of the Laser Based Additive Manufacturing Process in the Manufacture of Fractal Like Heat Transfer Devices, Key Engineering Materials, ISSN: 1662-9795, vol. 572, pp. 605-608, © 2014 *Trans Tech Publications*, Switzerland, Sep. 18, 2013.

* cited by examiner

VACUUM GAP GENERATORS AND MOTORS

RELATED APPLICATION

This application claims the benefit under 35 U.S.C. § 119(e) of the priority of U.S. Provisional Application No. 62/028,016, entitled "VACUUM GAP GENERATOR" and filed on Jul. 23, 2014, the entire disclosure of which is hereby incorporated by reference.

TECHNICAL FIELD

This disclosure generally relates to generators and motors and more specifically to generators and motors having a vacuum gap between their rotors and stators.

BACKGROUND

Electrical generators and motors, including those used in aircraft, typically include a rotor and a stator. The rotor rotates either within the stationary stator or around the stationary stator in order to produce an electrical current. The gap between the rotor and stator is typically filled with a gas such as air in order to cool the rotor as it rotates.

SUMMARY OF PARTICULAR EMBODIMENTS

According to one embodiment, a generator or an alternating current (AC) motor includes a stator and a rotor. The rotor is configured to rotate at least partially within the stator or around the stator and is separated from the stator by a gap having a partial vacuum. The rotor includes a shaft configured to permit a flow of coolant and a plurality of microchannels formed within the rotor. The microchannels are fluidly coupled to the shaft and are configured to permit the coolant to pass from the shaft through at least a portion of the rotor in order to provide cooling for the rotor.

Technical advantages of certain embodiments may include providing an electrical generator that has a reduced heat load than typical generators. This may increase the overall efficiency of the generator and may reduce overall electrical power generation costs. Other technical advantages will be readily apparent to one skilled in the art from the following figures, descriptions, and claims. Moreover, while specific advantages have been enumerated above, various embodiments may include all, some, or none of the enumerated advantages.

DESCRIPTION OF EXAMPLE EMBODIMENTS

Some generators and motors utilize a stationary stator and a rotor that rotates either within the stator or around the stator. For example, some electrical generators utilize a rotating rotor to produce a magnetic field that induces an electrical current in windings of the stator. As another example, some motors utilize an alternating current (AC) in the windings of a stator to cause a rotor to rotate. Typically, the rotor of a generator or motor is separated from the stator by a gap that is filled with a gas such as air. The air in the gap provides cooling to the rotating rotor. The air, however, causes windage losses which reduce the efficiency of the generator or motor.

The teachings of the disclosure recognize that it is desirable to provide a device that reduces or otherwise eliminates the windage losses of typical generators and AC motors that are due to air gaps between their rotor and stator. The following describes devices that utilize a vacuum gap between a rotating rotor and a stationary stator in order to reduce or prevent windage losses. In addition, embodiments of a rotor having microchannels for cooling the rotor are provided. The rotor may be a single member that is formed from an additive manufacturing process that allows microchannels for carrying coolant to be formed in any desirable shape and location within the rotor.

Figure 1:
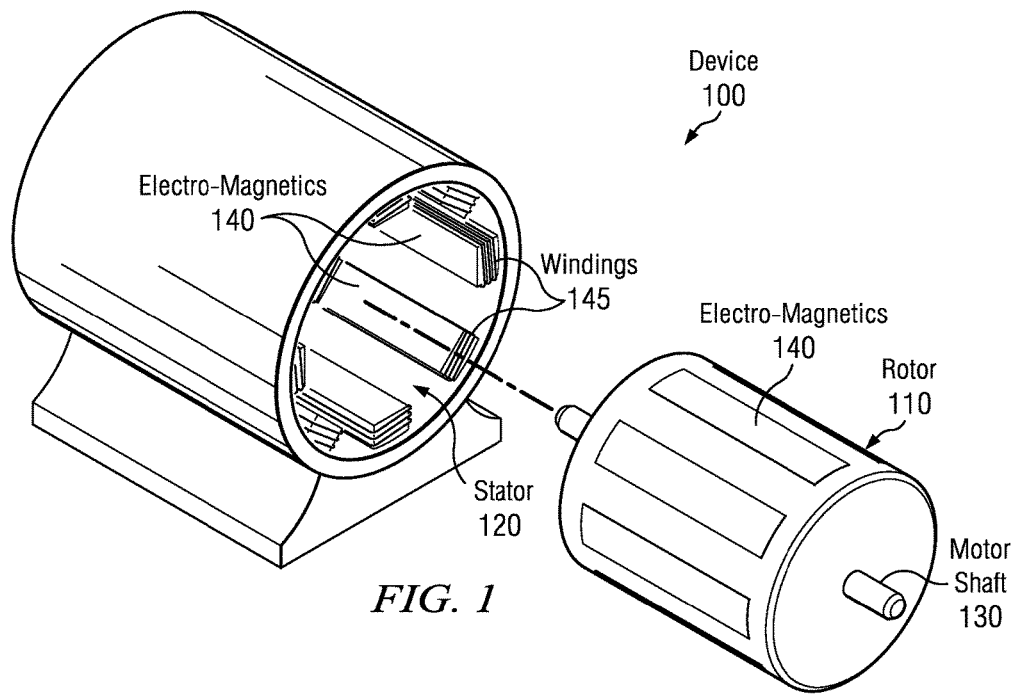
FIG. 1 illustrates an example device having a rotor and a stator, according to certain embodiments.
Figure 5A:
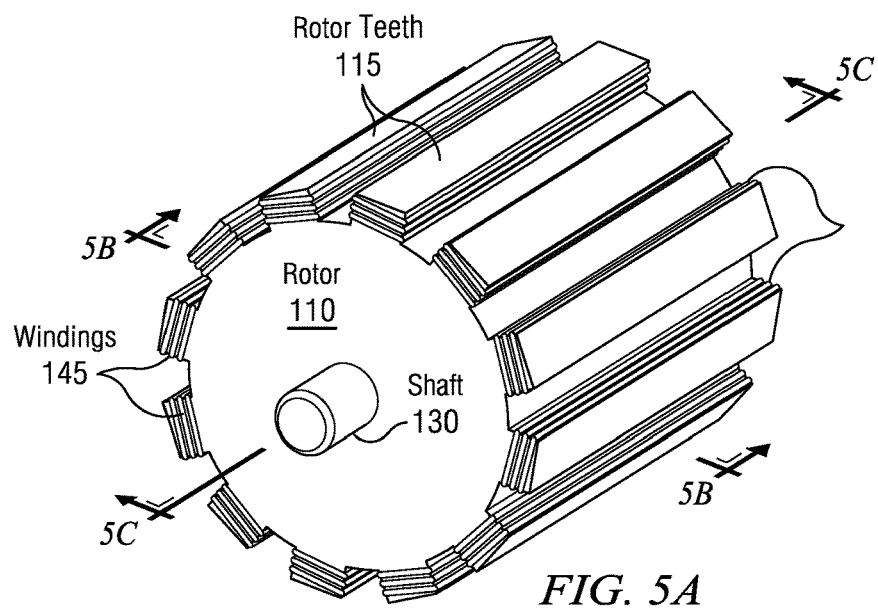
FIGS. 5A-5C illustrate an embodiment of the rotor of FIG. 4, according to certain embodiments.
Figure 5B:
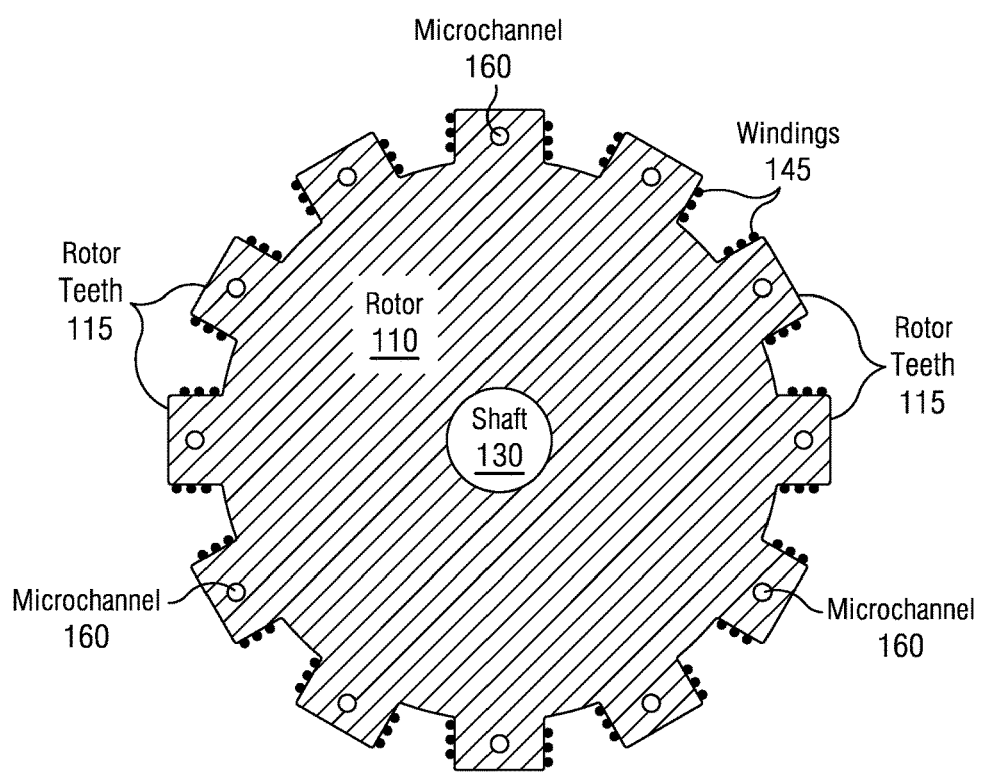
Figure 5C:
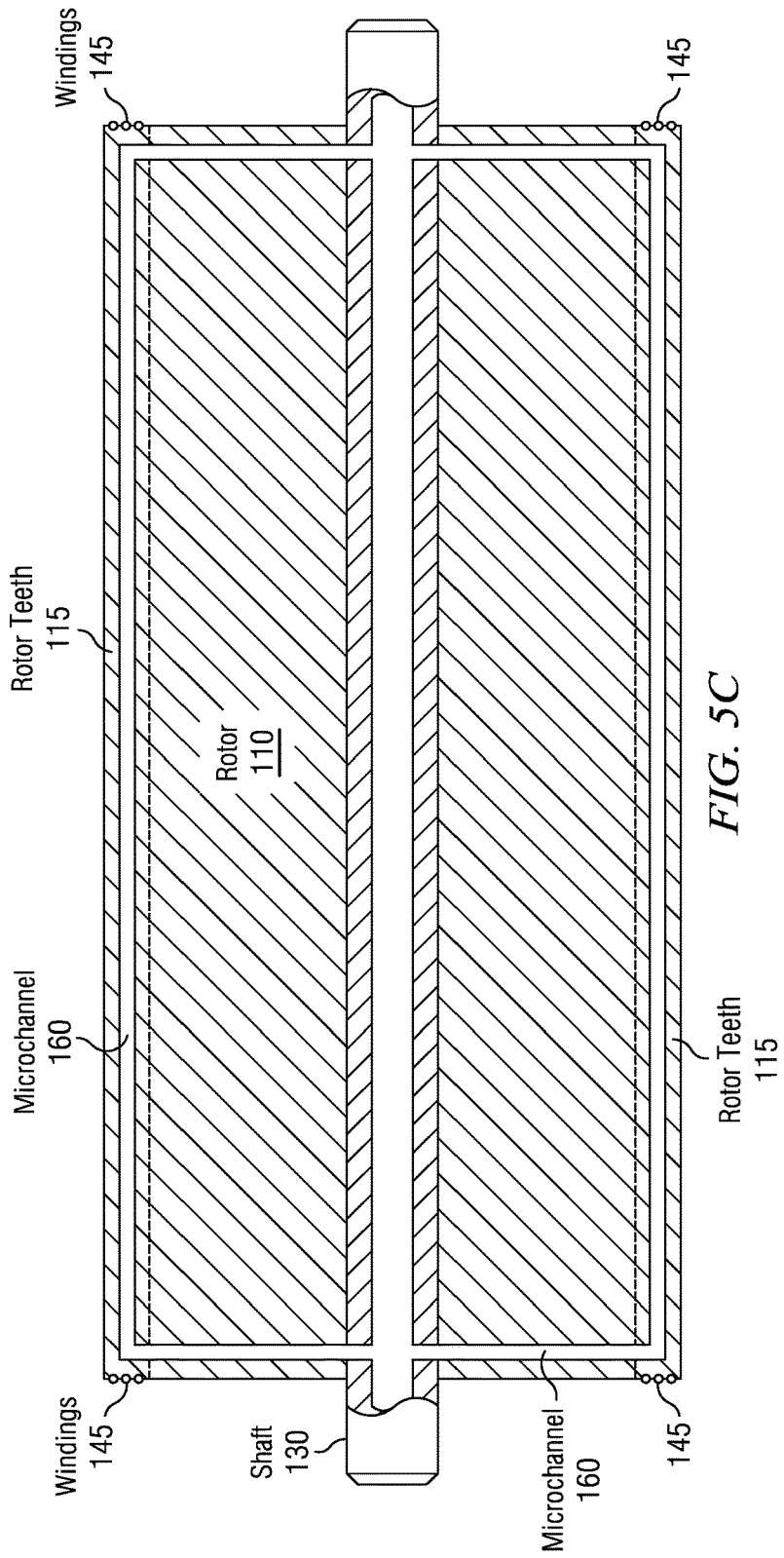

FIG. 1 illustrates an example device 100 having a rotor 110 and a stator 120. Device 100 could be any electrical generator or AC motor. For example, device 100 could be an electrical generator used in an aircraft. Rotor 110 may include a shaft 130. Rotor 110 and stator 120 may include any number and arrangement of electro-magnetics 140 that include windings 145. In some embodiments, windings 145 of electro-magnetics 140 of rotor 110 may be wound about or otherwise located proximate to rotor teeth 115, as illustrated in FIGS. 5A-5C.

In general, rotor 110 may be positioned either partially or fully within stator 120, which is stationary. For example, in embodiments where device 100 is a generator, rotor 110 rotates within stator 120 in order to generate an electromagnetic field and thus an electrical current within windings of stator 120. For example, the engines of an aircraft may be utilized to spin rotor 110 within stator 120 in order to produce electricity for the aircraft. In some embodiments, rotor 110 may alternately spin around stationary stator 120. As another example, in embodiments where device 100 is an AC motor, rotor 110 rotates within stator 120 in response to an electromagnetic field that is generated by applying an electrical current to electro-magnetics 140 of stator 120. Rotor 110 of the AC motor may be used to rotate any object such as a wheel, a propeller, and the like.

Figure 2:
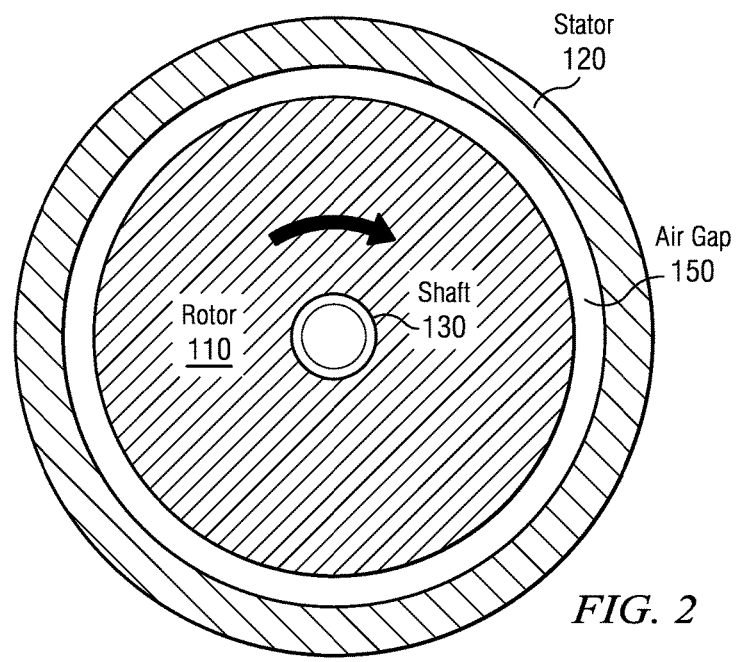
FIG. 2 illustrates a simplified cross-section of the rotor and stator of the device of FIG. 1, according to certain embodiments.

FIG. 2 illustrates a simplified cross-section of rotor 110 spinning within stator 120, according to certain embodiments. As illustrated, an air gap 150 typically exists between rotor 110 and stator 120. Air gap 150 is a space that is typically filled with air in order to provide cooling for spinning rotor 110. In some embodiments, air gap 150 may be filled with any other gas such as helium, hydrogen, or any other gas with a lower atomic weight in order to reduce the windage losses while providing cooling. The air (or other gas) within air gap 150, however, may cause undesirable windage heat losses within the device. In other words, the device looses efficiency by having to spin rotor 110 within the air (or other gas) within air gap 150. In addition, undesirable arcing and corona discharge is possible across air gap 150 in some higher voltage generators operating at high altitudes, where the thin air tends to break down and cause arcing.

Figure 3:
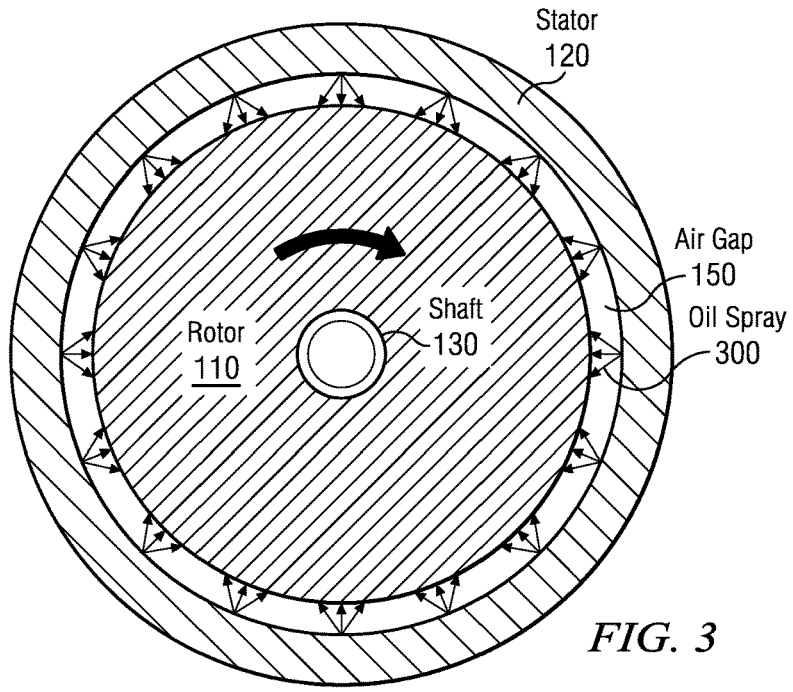
FIG. 3 illustrates a simplified cross-section of a device that utilizes an oil spray to cool the rotor of the device of FIG. 1, according to certain embodiments.

FIG. 3 illustrates a simplified cross-section of a device that utilizes an oil spray 300 to cool rotor 110 spinning within stator 120, according to certain embodiments. Some modern airborne generators use oil spray 300 on rotor 110 to provide cooling. For example, nozzles within stator 120 may be used to spray an oil onto rotor 110 as it spins in order to cool rotor 110. While utilizing oil spray 300 to cool rotor 110 may reduce the size of air gap 150, oil may get trapped in air gap 150. This may add significantly to windage losses and heat build up of the device which may actually add to the total heat load of the aircraft.

Figure 4:
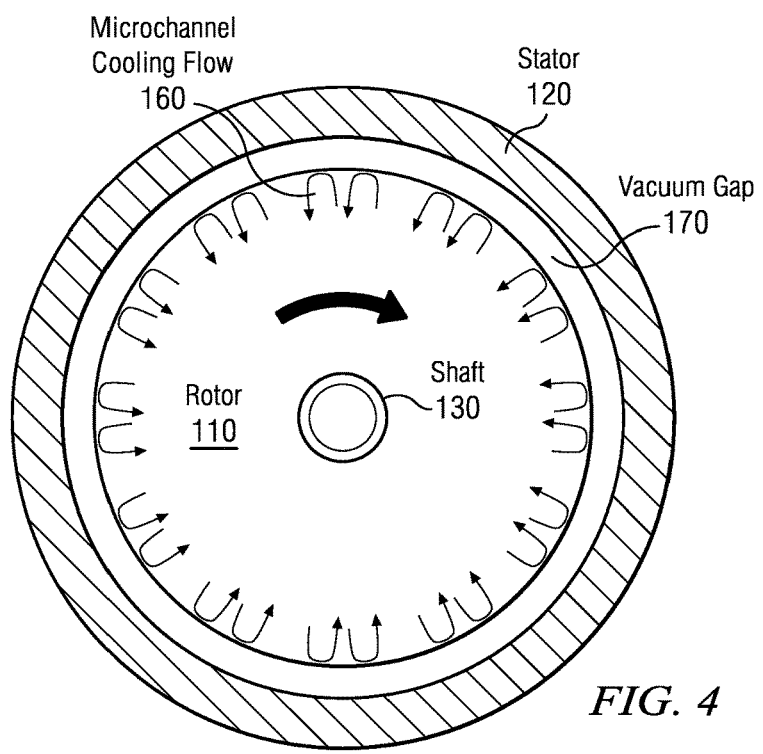
FIG. 4 illustrates a simplified cross-section of a device that utilizes a vacuum gap and one or more microchannels in order to cool the rotor of the device of FIG. 1, according to certain embodiments.

FIG. 4 illustrates a simplified cross-section of device 100 that utilizes a vacuum gap 170 and one or more microchannels 160 in order to cool rotor 110 spinning within stator 120, according to certain embodiments. In general, vacuum gap 170 is an area in which all or substantially all of the air or other gas has been removed. By using a vacuum gap 170 between rotor 110 and stator 120 instead of air gap 150, windage heat losses of typical devices are substantially reduced or eliminated.

To provide vacuum gap 170, device 100 (e.g., generator or AC motor) is sealed and the gap between rotor 110 and stator 120 is evacuated to at least a partial vacuum. As used herein, forming a partial vacuum within vacuum gap 170 refers to at least partially removing gas, especially air, from vacuum gap 170 so that the gas remaining in vacuum gap 170 exerts less pressure than the atmosphere (i.e., the gaseous pressure is less that the atmospheric pressure). The partial vacuum within vacuum gap 170 solves two problems at once: 1) it reduces or eliminates any windage losses which in turn reduces heat load and increases efficiency, and 2) it eliminates any arcing and corona discharge possible with higher voltage generators with air gaps operating at high altitudes where thin air will tend to break down and arc. This enables a smaller gap and reduces device volume and weight.

FIGS. 5A-5C illustrate an embodiment of rotor 110 of FIG. 4. In some embodiments, rotor 110 may include any number and configuration of rotor teeth 115. Typically, windings 145 are wound around rotor teeth 115 to form electro-magnetics 140. Windings 145 (i.e., coils) are heated not only by windage losses, but also by the electrical losses associated with power generation. Typically, windings 145 must be cooled in order for the device to operate properly. This cooling is typically provided by air or other gas in air gap 150 as rotor 110 spins within stator 120, as described above. However, since the embodiments of FIGS. 4 and 5A-5C include a vacuum gap 170 in which the air has been partially removed, one or more microchannels 160 within rotor 110 are utilized to provide a coolant to various parts of rotor 110, thereby cooling windings 145 and rotor 110. For example, microchannels 160 may be fluidly connected to shaft 130 and may run along at least portions of rotor teeth 115 (e.g., close to the rotor windings 145) as illustrated. A coolant such as polyalphaolefin (PAO) (or any other appropriate coolant) may then be pumped through shaft 130 and through microchannels 160 in order to provide cooling to rotor windings 145 that are wound around rotor teeth 115. In some embodiments, shaft 130 may be hollow and may connect to a rotating joint (not illustrated) on one or both ends of shaft 130. While a particular number and configuration of microchannels 160 is illustrated in FIGS. 5A-5C, other embodiments may include any appropriate configuration and number of microchannels 160. Particular example configurations of microchannels 160 are discussed further below in reference to FIGS. 6A and 6B.

Microchannels 160 in general are small tubes or pipes formed within rotor 110 that carry coolant to and from shaft 130 in order to cool rotor 110. Microchannels 160 may have any appropriate cross-sectional size and shape. In some embodiments, each microchannel 160 has a smaller cross-sectional diameter or width than those of windings 145. In some embodiments, microchannels 160 have a round, square, or any other cross-sectional shape. In some embodiments, microchannels 160 have millimeter or micron widths. For example, microchannels 160 have diameters or widths between 0 and 1 millimeter (inclusive), between 1 and 10 millimeters (inclusive), or between 10 and 100 millimeters (inclusive). As another example, microchannels 160 have diameters or widths between 0 and 1 micrometer (inclusive), between 1 and 10 micrometers (inclusive), between 10 and 100 micrometers (inclusive), or between 100 and 1000 micrometers (inclusive). As used herein, "microchannel" 160 may have any appropriate width or diameter and is not limited to having micron widths or diameters. In some embodiments where microchannels 160 have extremely small sizes, a filtered or otherwise ultra-cleaned non-reacting coolant may be utilized to prevent clogging of microchannels 160 from corrosion and particulates.

In some embodiments, rotor 110 is manufactured using direct or additive manufacturing (e.g., 3D printing) and is made of any appropriate material (e.g., any ferrous material such as steel or iron). These manufacturing techniques allow microchannels 160 to be produced within rotor 110 in any desired configuration that would otherwise not be possible with conventional techniques that are typically used to manufacture rotor 110. This allows cooling to be provided to any part of rotor 110 (e.g., to rotor teeth 115 and/or rotor coils wound about rotor teeth 115) without needing an air gap 150 or oil spray 300, as many conventional devices utilize. It also allows for microchannels 160 to have any size or cross-sectional shape (e.g., round, square, etc.) and to be routed anywhere in rotor 110 (e.g., close to surfaces of rotor 110), without regard to the geometric and size limitations of traditional manufacturing.

Figure 6A:
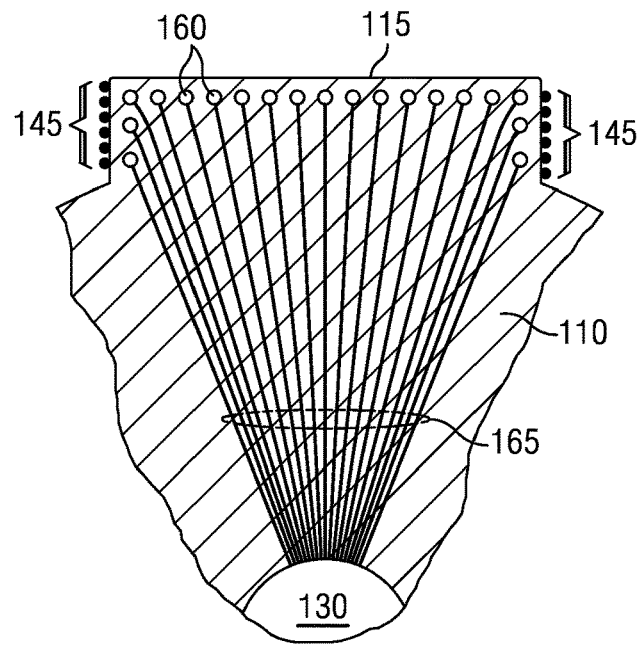
FIGS. 6A-6B illustrate magnified portions of the rotor of FIG. 4, according to certain embodiments.
Figure 6B:
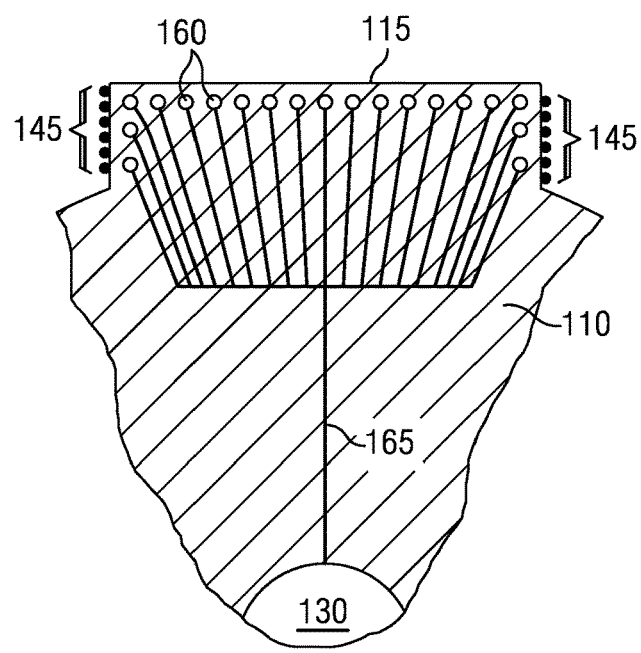

FIGS. 6A-6B illustrate portions of rotor 110 of FIG. 4, according to certain embodiments. In these embodiments, rotor 110 includes multiple microchannels 160 within rotor teeth 115. Each microchannel 160 is fluidly coupled to shaft 130 via one or more lines 165. Lines 165 are depicted in FIGS. 6A-6B as schematic connections (i.e., lines 165 depict how microchannels 160 are conceptually connected to shaft 130 but do not necessarily depict the actual physical characteristics of lines 165 or the physical paths through rotor 110). For example, as illustrated in FIG. 6A, each microchannel 160 may be individually coupled to shaft 130 via its own line 165 (e.g., as illustrated in detail in FIG. 5c). As another example, as illustrated in FIG. 6B, all microchannels 160 may be coupled to shaft 130 via a single line 165 (e.g., each microchannel 160 is coupled to its own line 165, and all the individual lines 165 are coupled to a main line 165 that in turn is coupled to shaft 130). While certain quantities and arrangements of microchannels 160 and lines 165 are illustrated in FIGS. 6A and 6B, any number and arrangement of microchannels 160 and lines 165 is possible. Furthermore, lines 165 may have any appropriate physical cross-sectional shape and size and, in some embodiments, may be identical to microchannels 160.

As illustrated in FIGS. 6A and 6B, some embodiments include many microchannels 160 that are located as close as possible to windings 145 in order to provide as much cooling as possible for windings 145—the main heat source for rotor 110. In addition, as discussed above, microchannels 160 may, in some embodiments, have a cross-sectional diameter or width that is significantly smaller than those of windings 145. By being significantly smaller than windings 145, microchannels 160 may cause less hysteresis losses than larger pipes or channels. As magnetic fields flow through rotor 110, any discontinuities in rotor 110 may increase losses in energy due to heat. By utilizing very small microchannels 160, however, discontinuities of rotor 110 are minimized and hysteresis losses within rotor 110 are reduced, thereby allowing the partial vacuum within vacuum gap 170 to function better. This improves the efficiency and overall performance of device 100.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device comprising:
   a stator; and
   a rotor configured to be positioned at least partially within the stator and to rotate within the stator, the rotor being separated from the stator by a gap comprising a partial vacuum, the rotor formed from a ferrous material using additive manufacturing, the rotor comprising:
   a shaft configured to permit a flow of coolant within the shaft;
   a plurality of electromagnets, each electromagnet comprising a plurality of windings; and
   a plurality of microchannels formed within the rotor and fluidly coupled to the shaft, wherein:
   at least one microchannel is located proximate to one of the windings;
   the microchannels are configured to permit the coolant to pass from the shaft through at least a portion of the rotor in order to provide cooling for the rotor; and
   wherein the rotor comprises:
   a plurality of rotor teeth;
   a plurality of rotor windings, each of the one or more rotor winding being located proximate to one of the rotor teeth; and
   wherein at least one of the microchannels passes through at least a portion of one of the rotor teeth along a longitudinal direction aligned with a rotation axis of the rotor.

2. The device of claim 1, wherein the plurality of microchannels comprise cross-sectional diameters that are less than cross-sectional diameters of the plurality of rotor windings.

3. The device of claim 1, wherein the device is a generator or an alternating current (AC) motor.

4. The device of claim 1, wherein the coolant comprises polyalphaolefin (PAO).

5. The device of claim 1, wherein the ferrous material comprises steel or iron.

6. A device comprising:
   a stator; and
   a rotor configured to rotate at least partially within the stator or around the stator, the rotor being separated from the stator by a gap comprising a partial vacuum, the rotor comprising:
   a shaft configured to permit a flow of coolant;
   a plurality of microchannels formed within the rotor and fluidly coupled to the shaft, the microchannels configured to permit the coolant to pass from the shaft through at least a portion of the rotor in order to provide cooling for the rotor; and
   wherein the rotor comprises:
   a plurality of rotor teeth;
   a plurality of rotor windings, each of the one or more rotor winding being located proximate to one of the rotor teeth; and
   wherein at least one of the microchannels passes through at least a portion of one of the rotor teeth along a longitudinal direction aligned with a rotation axis of the rotor.

7. The device of claim 6, wherein the rotor comprises a single member that is formed using additive manufacturing.

8. The device of claim 6, wherein the rotor is formed using steel or iron.

9. The device of claim 6, wherein the plurality of microchannels comprise cross-sectional diameters that are less than cross-sectional diameters of the plurality of rotor windings.

10. The device of claim 6, wherein the coolant comprises polyalphaolefin (PAO).

11. The device of claim 6, wherein:
    the device comprises an electrical generator; and
    rotation of the rotor by mechanical energy causes a voltage to be induced in electromagnets of the stator.

12. The device of claim 11, wherein the electrical generator is configured to be installed in an aircraft.

13. The device of claim 6, wherein:
    the device comprises an alternating current (AC) motor; and
    the rotor rotates in response to rotating magnetic fields caused by electromagnets of the stator.

14. A generator comprising:
    a stator;
    a rotor configured to rotate at least partially within the stator or around the stator, the rotor being separated from the stator by a gap comprising a partial vacuum, the rotor comprising a plurality of microchannels formed within the rotor and fluidly coupled to a shaft of the rotor, the microchannels configured to permit a coolant to pass from the shaft through at least a portion of the rotor in order to provide cooling for the rotor; and wherein the rotor comprises:

a plurality of rotor teeth;

a plurality of rotor windings, each of the one or more rotor winding being located proximate to one of the rotor teeth; and wherein at least one of the microchannels passes through at least a portion of one of the rotor teeth along a longitudinal direction aligned with a rotation axis of the rotor.

15. The generator of claim 14, wherein the plurality of microchannels comprise cross-sectional diameters that are less than cross-sectional diameters of the plurality of rotor windings.

16. The generator of claim 14, wherein the coolant comprises polyalphaolefin (PAO).

\* \* \* \* \*